United States Patent [19]

Story

[11] 4,410,789
[45] Oct. 18, 1983

[54] REMOTE CONTROL FOR WELDING MACHINE AMPERAGE

[76] Inventor: Alan R. Story, P.O. Box 2065, Mills, Wyo. 82644

[21] Appl. No.: 300,493

[22] Filed: Sep. 9, 1981

[51] Int. Cl.³ .............................................. B23K 9/10
[52] U.S. Cl. ............................... 219/132; 340/825.72; 340/825.76
[58] Field of Search .................. 219/132; 340/825.23, 340/825.72, 825.73, 825.76

[56] References Cited

U.S. PATENT DOCUMENTS

| 2,175,882 | 10/1939 | DeCroce | 219/132 |
| 2,175,891 | 10/1939 | Graham | 219/132 |
| 2,293,166 | 8/1942 | Olson | 340/825.72 |
| 2,388,748 | 11/1945 | Kopetzky | 340/825.72 |
| 2,677,122 | 4/1954 | Gardner, Jr. | 340/825.76 |

*Primary Examiner*—C. C. Shaw
*Attorney, Agent, or Firm*—Harvey B. Jacobson

[57] ABSTRACT

A solenoid operated, ratchet-type step motor incrementally advances the rheostat of a welding apparatus in opposite directions to control welding current. The solenoids are pulsed in response to reception of a frequency and digitally coded radiant energy signal by a receiver to which signals are transmitted from a remote transmitter having direction selecting push button switches.

4 Claims, 1 Drawing Figure

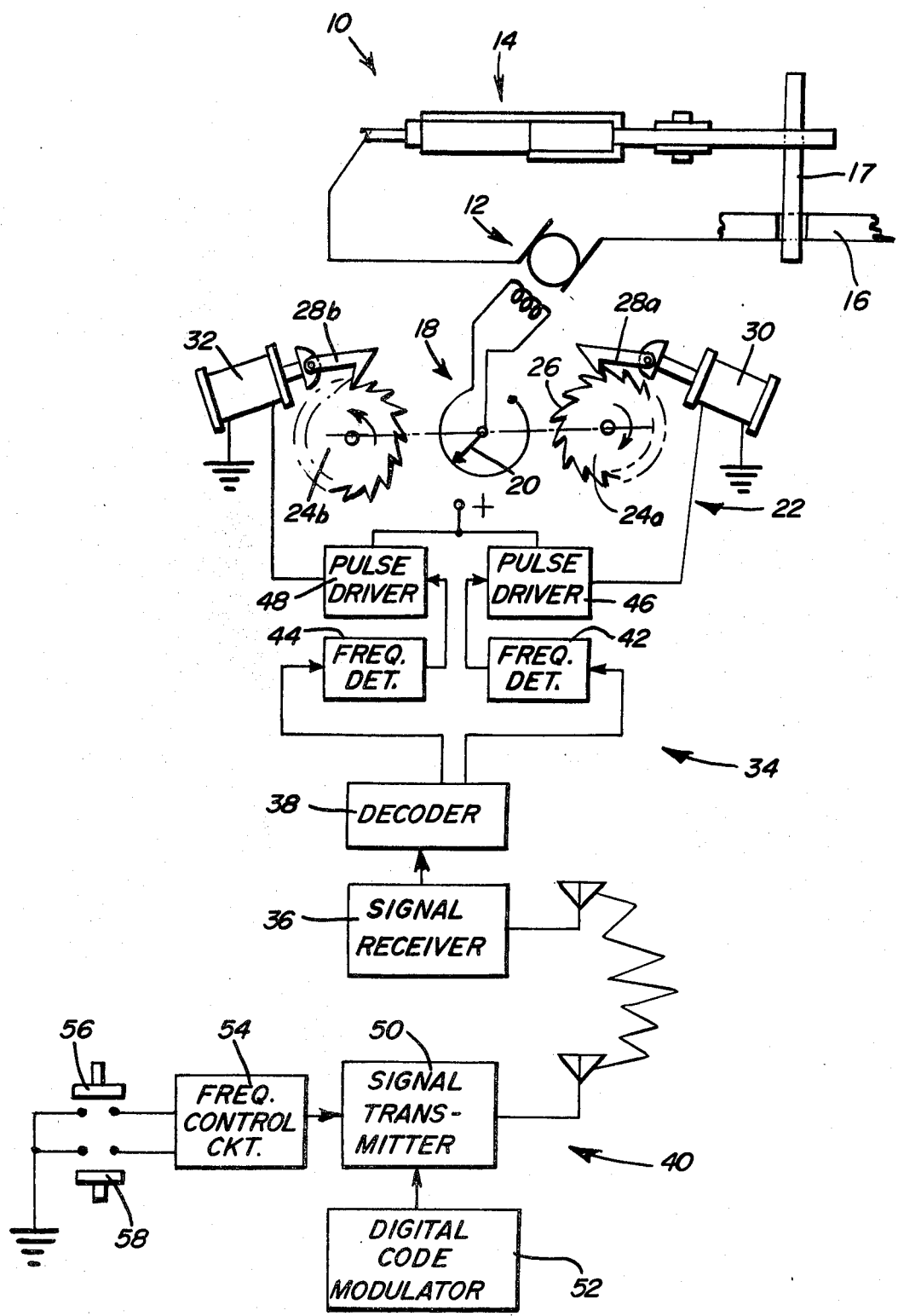

REMOTE CONTROL FOR WELDING MACHINE AMPERAGE

BACKGROUND OF THE INVENTION

This invention relates in general to improvements in the amperage control of arc welding machines.

Remote control over current controlling rheostats for welding machines is already well known. Various wire connections are usually involved in such remote control arrangements subject to rapid wear and often causing malfunction because of deterioration or accidental rupture. It is therefore an important object of the present invention to provide a wireless and therefore lightweight type of remote control for welding current which is both reliable in operation and relatively low in cost.

SUMMARY OF THE INVENTION

In accordance with the present invention, radiant energy, that is frequency and digitally coded, is transmitted from a portable transmitter to trigger operation of a receiver through which a pair of solenoids in a ratchet-type sevo motor are pulsed to incrementally advance the rheostat of a welding machine in a current increasing or decreasing direction. The frequency of the transmitted signal selects the solenoid that is pulsed and the direction in which the rheostat is advanced. The digital coding modulating the transmitted signal prevents interference. Any suitable radiant energy may be utilized as the signal medium including radio frequency energy.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING

The drawing is a schematic illustration of the apparatus and controls associated with the present invention.

DETAILED DESCRIPTION OF PREFERRED EMBODIMENT

Referring now to the drawing in detail, a generally well known welding apparatus is shown generally referred to by reference numeral 10. The welding apparatus includes a welding generator 12 connected by conductors to a welding electrode holder 14 and a workpiece 16 with respect to which an electrode 17 is positioned by the holder. The welding current to the electrode is controlled by an amperage control device 18, which is usually mounted adjacent the electrode and workpiece. The rheostat wiper 20 associated with the control device 18 is rotatable through its shaft in opposite directions to effect an increase or a decrease in the welding current as is already well known in the art.

In accordance with the present invention, the rheostat wiper 20 is incrementally advanced in opposite directions by a step motor type of servo, generally referred to by reference numeral 22. The step motor includes two ratchet wheels 24a and 24b secured to the shaft 26 of the wiper 20, the ratchet wheels having one-way ratchet teeth inclined in opposite rotational directions. Engaging ratchet pawls 28a and 28b are adapted to advance the ratchet wheels and wiper in opposite directions in response to driving pulses applied to solenoids 30 and 32. Electrical energy from any suitable source is applied to the solenoids under control of a remotely controlled receiving unit, generally referred to by reference numeral 34, located adjacent to the welding apparatus.

The receiving unit 34 includes a radiant energy signal receiver 36 through which a coded carrier signal at one of two distinct frequencies is received and processed through a decoder 38 so as to limit response of the receiving unit to signals originating from a remotely located transmitting unit 40. The decoded signal is fed from decoder 38 to a pair of frequency detectors 42 and 44, one of which detects the signal frequency to trigger operation of one of two pulse drivers 46 and 48, respectively connected to the solenoids 30 and 32. Each signal pulse applied advances one of the ratchet wheels by one step.

The transmitting unit 40 includes a carrier signal generating transmitter 50 from which signal energy is radiated to the receiver 36. The carrier signal is modulated by a digital code modulator 52 compatible with the decoding operation of decoder 38. The frequency of the carrier signal is established through a frequency control circuit 54 to impart to the radiated signal a directional control function. One of two frequencies, to which the frequency detectors 42 and 44 respond, is selected by actuation of frequency selector switches 56 and 58 of the push button type.

The operator by merely actuating one or the other of the switches 56 and 58 triggers operation of the transmitting unit 40 to transmit a frequency and digitally coded signal to the receiving unit 34. The receiving unit responds exclusively to such signal to pulse a selected one of the solenoids 30 and 32 effecting a step movement of the amperage control device 18 in a current increasing or decreasing direction. The transmitting unit may be a portable hand held device from which radio signals of short range are emitted. The carrier signal may be either AM or FM digitally coded to prevent interference with other welding apparatus and any other unintentional operation of the amperage control device. The receiving unit so keyed to the transmitting unit may be mounted on the welding machine or apparatus housing.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be restored to, falling within the scope of the invention.

What is claimed as new is as follows:

1. In combination with an amperage control device for welding apparatus having a welding generator, a rotatable rheostat for regulating welding current conducted to a welding electrode, a reversible step motor connected to the rheostat, pulse driving means connected to the step motor for incremental displacement of the rheostat and frequency responsive means connected to the pulse driving means for selecting the direction in which the step motor displaces the rheostat, the improvement including a radiant energy receiver, decoding means connected to the receiver for transmitting only digitally coded signals to the frequency responsive means, remote transmitter means for radiating said digitally coded signals to the receiver, and directional control means connected to the transmitter means for selecting two frequencies at which the digitally coded signals are transmitted by the frequency responsive means to the pulse driving means.

2. The improvement as defined in claim 1 wherein said servo motor includes a pair of ratchet wheels, a pair of ratchet pawls engageable with said ratchet wheels for incremental advancement thereof in opposite directions, and a pair of pulse operated solenoids to which the pawls are operatively connected, said solenoids being connected to the pulse driving means.

3. The improvement as defined in claim 2 wherein said transmitter means includes a signal generator from which said signals are emitted, frequency controlling circuit means connected to the signal generator for emitting signals at one of said two frequencies, and said directional control means being connected to the circuit means for selecting one of said two frequencies.

4. The improvement as defined in claim 2 wherein said transmitter means includes a signal generator from which said control signals are emitted to the receiving means, frequency controlling circuit means connected to the signal generator for emitting of the frequency signals at one of the two frequencies, said directional control means being connected to the circuit means for selecting one of said two frequencies.

* * * * *